United States Patent
Coulter et al.

(12)
(10) Patent No.: US 6,465,787 B1
(45) Date of Patent: Oct. 15, 2002

(54) COVERT SURVEILLANCE SYSTEM FOR TRACKING LIGHT SENSITIVE TAGGED MOVING VEHICLES

(75) Inventors: John K. Coulter, Alexandria, VA (US); Christopher F. Klein, Manhattan Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/633,319

(22) Filed: Aug. 7, 2000

(51) Int. Cl.[7] .............................................. G02B 5/122
(52) U.S. Cl. ................... 250/341.3; 250/568; 250/566; 356/364; 356/368
(58) Field of Search .............................. 250/341.3, 568, 250/566; 356/364, 368

(56) References Cited

U.S. PATENT DOCUMENTS 4,658,147 A * 4/1987 Eldering ..................... 250/566
6,017,125 A * 1/2000 Vann .......................... 250/568

* cited by examiner

*Primary Examiner*—Constantine Hannaher
*Assistant Examiner*—Andrew Israel
(74) *Attorney, Agent, or Firm*—Derrick Michael Reid

(57) ABSTRACT

A surveillance system uses pulsed laser near infrared light to illuminate a retroreflecting tag attached to a target for providing a return image that pulsates and that can be monitored by a camera for covert tracking of a target. The surveillance system may instead use pulsed near infrared polarized laser light to illuminate a transparent ¼ waveplate tag affixed to a moving vehicle or transitory containers for monitoring enhanced return images reflected from the tags serving to change the polarization of the illuminating laser beam so as to provide a co-located camera with return images that pulsate relative to background images for enhanced viewing and surveillance of the vehicle or container.

15 Claims, 1 Drawing Sheet

SURVEILLANCE SYSTEM

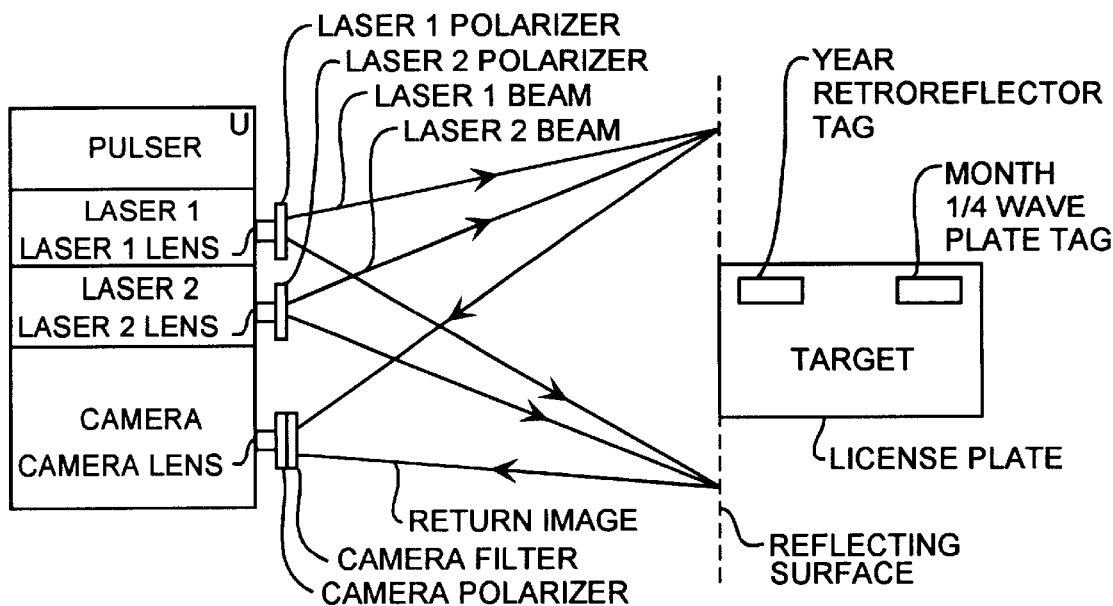
FIG. 1  SURVEILLANCE SYSTEM
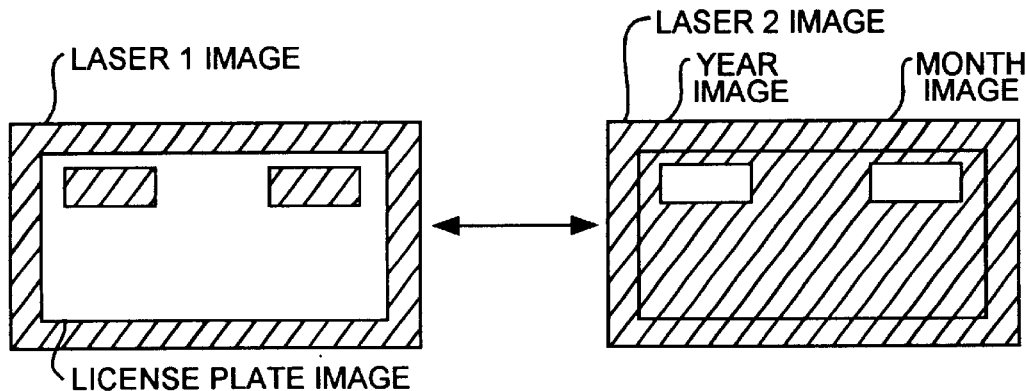
FIG. 2A  DUAL LASER IMAGES
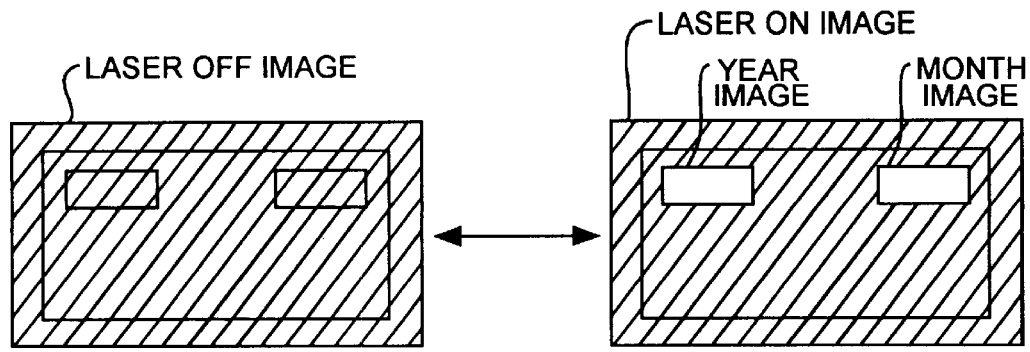
FIG. 2B  SINGLE LASER IMAGES

COVERT SURVEILLANCE SYSTEM FOR TRACKING LIGHT SENSITIVE TAGGED MOVING VEHICLES

STATEMENT OF GOVERNMENT INTEREST

The invention was made with Government support under contract No. 98-P346490-000 by a classified agency of the U.S. Government. The Government has certain rights in the invention.

FIELD OF THE INVENTION

The invention relates to the field of optical imaging and surveillance. More particularly, the present invention relates to the use of laser illumination of surveillance tags for tracking a tagged moving vehicle.

BACKGROUND OF THE INVENTION

Covert tracking of a suspect vehicle through traffic is difficult for law enforcement personnel. No known low-cost optical technological aids are currently available to assist with this task. Currently, vehicles are optically tracked using telescoping cameras and telescopes without any visual enhancement. The tracking is usually done by following ground based police cars with overhead helicopters. Often it is difficult to track and follow the suspect vehicle through congested traffic. These and other disadvantages are solved or reduced using the invention.

SUMMARY OF THE INVENTION

An object of the invention is to provide a system for covertly tracking a vehicle through traffic.

Another object of the invention is to provide a system for illuminating a ¼ waveplate tag on a vehicle with pulsating polarized light for optically detecting the tag disposed on a vehicle.

Yet another object of the invention is to provide a system for illuminating a ¼ waveplate tag with pulsating polarized light for optically detecting the tag disposed on a vehicle for providing an optical reference for following and tracking the vehicle when in transit.

The invention is a system for optically enhancing an image of a tag disposed on a moving vehicle for improved ease of following and tracking the target that may be, for example, a moving vehicle or transitory cargo container. The tag may be a retroreflecting tag or ¼ waveplate tag on reflecting surface of the target. The tags provide enhanced optical signals recognition and tracking when the target is transitory. The optical enhancement causes the tagged vehicle to stand out prominently from other vehicles thereby significantly improving an ability to track the moving target. In a preferred form, infrared illumination that is not detectable by the human eye is used to optically enhance an image of the tag affixed to the target. The illumination is turned alternately on and off so that the reflected image from the tag pulsates, as observed through an optical device. The system includes an illumination means, viewing means and a tag disposed on the target. The illumination means is preferably a pulsed laser and the monitoring means is preferably a camera, both of which are co-located at a stand-alone tracking unit. Because the tracking unit can be made from solid state devices, the covert tracking unit for carrying out the invention is a rugged, compact, inexpensive device that is readily amenable to wide-spread field use.

The system preferably includes a video camera or camcorder, or other optical imaging means that records during covert tracking. In one preferred form of carrying out the invention, two near infrared laser diodes with internal beam collimating optics are used to illuminate one or more tags for enhanced recognition of the target from background images. The ¼ waveplate tags consist of a transparent birefringent material that is a quarter waveplate with adhesive backing so that the tags can be readily applied to a reflecting surface of the vehicle being tracked. The ¼ waveplate tags provide for polarization rotation so that polarized filters associated with the viewing means can isolate images reflected from the tags while blocking other background images. The tags may be disposed, for example, on the rear license plate of the vehicle to be tracked with the license plates acting as retroreflectors. The tags are small and transparent, for example 1–2" transparent squares, which are unnoticeable to the human eye under casual inspection leading to covert tracking use. In one embodiment, the tags may be simple retroreflectors affixed to a non-reflecting surface of the target. After applying one or more of the tags to the target, the operator of the monitoring camera attempts to keep the target vehicle in the viewfinder of the video camera.

In a preferred form, the monitoring camera can be any commercial camcorder capable of detecting near infrared light at 800–950 nm. The camera is fitted with a polarizer that preferentially transmits linearly polarized light oriented in a given direction, for example, blocking horizontally polarized light and passing vertically polarized light. One of the two laser diode light sources mounted to the camera emits vertically polarized near infrared light at 800–950 nm that is reflected from the retro-reflecting tags on the license plate of the target vehicle. The vertically polarized light is detected by the camera. The quarter waveplate tags that are oriented with their fast and slow axes at 45 degrees to the vertical, rotate the vertically-polarized light from the laser into horizontally-polarized light, and the vertical polarizer on the camera blocks the light reflected from the tags. Thus, the observer sees a bright license plate with dark spots where the tags are placed. The first laser is then turned off and a second laser is turned on. The second laser is identical to the first except that the second laser emits horizontally polarized light. The horizontally polarized light is blocked from detection by the camera for all parts of the scene field of view except the tagged areas that have rotated the horizontal light into vertically polarized light. The result is that by alternately flashing these two lasers at a nominal rate of several hertz that is perceptible to the human eye, the tagged target license plate appears in the camera as a checkerboard whose light and dark areas reverse each time one laser is switched to the other. This dual illumination approach exploits one of the most sensitive of human visual detection capabilities, that of detecting quick changes in a pulsating scene. By focusing the lasers to illuminate predominantly the license plate region of the target vehicle, unpolarized ambient light provides a nearly constant overall background image. Only the illuminated target plate will flicker from dark on bright to bright on dark, dramatically enhancing detection of the tag and the concomitant ability to track the tagged moving vehicle. These and other advantages will become more apparent from the following detailed description of the preferred embodiment.

BRIEF DESCRIPTION OF THE DRAWINGS

FIG. 1 is a diagram of a surveillance system.

FIG. 2A is a diagram of dual image reception.

FIG. 2B is a diagram of signal image reception.

DETAILED DESCRIPTION OF THE PREFERRED EMBODIMENT

An embodiment of the invention is described with reference to the figures using reference designations as shown in the figures. Referring to the figures, first and second lasers respectively provide first and second laser pulses that are alternately generated by a pulser that is a pulsed electrical power supply for providing first and second laser beams transmitted through respective first and second laser lenses and first and second laser polarizers to a target. The first and second lenses serve to focus the first and second laser beams onto a target that may be, for example, a motor vehicle or a cargo shipping container, each of which typically includes a governmental license plate. A typical license plate may include year and month registration sticker tag locations. Retro-reflecting tags and/or the ¼ waveplate tags are disposed on the target and may be more particularly disposed on the sticker tag locations of the license plate that may serve as a background retroreflector.

The tags are illuminated by the first and second lasers to reflect the pulsed laser light back towards a camera as a tag return image. The tag return image is received by a camera that may be for example a camcorder having a focusing lens and video recording means. The camera may further include a camera zoom lens for improved image resolution and focusing of the return image during recording and viewing. Additionally, the camera may further include a filter for blocking sunlight. In the preferred form, the camera also includes a polarizer for blocking and passing polarized light of particular orientations to enhance the preception of the pulsating tag return image.

In a first preferred embodiment, only one of the first and second lasers is used as a single pulsed light source for illuminating the retroreflecting tag that reflects the pulsed light to the camera. The pulsed light has no specifically oriented polarization and the camera polarizer is not used. The pulsed light illuminates the retroreflector tag. The retroreflector tag may be placed arbitrarily on any non-reflecting surface such as when the target does not have a suitable reflecting surface on which to stick the tags. The tags provide retroreflected light as the tag return image to provide a pulsating image of the retroreflecting tag. As shown in FIG. 2B, when using a single pulsed light source, one or more retroreflecting tags, such as two tags, may be used. The retroreflecting tags reflect an image of the tags that is pulsed in visual contrast from the surrounding background image. When the light source is on, the reflected image includes the reflections from the two tags. When the light source is off, there is no reflection from the tags, and the tag image as well as the background image is merged as a single dark return image without any contrast. When the laser is on, the tags provide for a tag return image with the tags contrasting with the non-reflecting background area of the target. The tag return image thus contains a pulsating image of the tags respecting the background image as the laser is turned on and off.

In a second preferred embodiment, the first and second lasers are replaced with a signal laser pulsed light source for illuminating the ¼ waveplate tag. The ¼-waveplate tag bi-directionally transmits pulsed laser light from the laser and to the camera with the pulsed laser light reflecting from a back surface of the tag. The transparent ¼ waveplate tag may have a reflecting backing, may be affixed to a reflecting surface of the target, or may be affixed to and over a retroreflecting tag, so that the pulsed laser light is both rotated by 90 degrees and reflected. The ¼-waveplate tag may be placed arbitrarily on any reflecting surface of the target. In the case of a non-reflecting surface of the target, the ¼ waveplate tag may be disposed on a retroreflecting tag, the two tags being preferably integrally formed as a single surveillance tag. The ¼-waveplate tag serves to rotate the polarization of the pulse laser light. The camera polarizer then serving to transmit the rotated polarized light to the camera as a pulsating, strobed image. The reflective backing, retroreflective tag or reflective target surface serves to reflect the pulsed laser light back through the ¼ waveplate tag. The laser is pulsed to provide a pulsating image of the tag.

An alternative equivalence would be to rapidly alternate the polarization state of the laser light from one state to another rather than pulsing the laser light on and off. Also, detection of the tagged license plate can be enhanced by rapidly switching the orientation of the polarizer on the viewer, or alternately, the polarizer on the source between two orthogonal positions, so that the observer sees the tagged license plate modulating between bright patches on a dark background and dark patches on a bright background. It is the contrast reversal of target against background that attracts the attention of a human observer.

In FIG. 2B, when using a single pulsed laser light source, one or two ¼ waveplates may be used to reflect an image of the tags that is pulsed in visual contrast from the surrounding background image. When the laser light source is on, the ¼ waveplate tag rotates the polarization of the laser light for passing the laser light from the ¼ waveplate tag but not from the background through the camera polarizer. When the light source is off, there is no polarization nor any reflection and the tag image as well as the background so the device does not provide any contrasting image.

The lasers may be linearly polarized light sources providing pulsed light that have planes of polarization oriented 45 degrees to the horizontal for illuminating the retroreflective license plate and tags. Several small patches of clear, optically birefringent material constituting quarter-waveplates can be pasted to the license plate. The fast and slow axes of the quarter-waveplates are oriented either horizontally or vertically. The incident linearly polarized light is oriented at 45 degrees and passes through the quarter-waveplate to be then converted into circularly polarized light. After reflecting off the license plate, the circularly polarized light passes through the quarter-waveplate a second time, and is converted back to linearly polarized light. However, during this reflection, the orientation of the polarization is rotated 90 degrees from the incident beam. In contrast, the portion of the incident light that strikes the area of the license plate without the quarter-waveplate is reflected back with the same orientation as the incident laser beam. The viewing device, with a polarizer oriented in the same azimuth as the incident beam, sees the areas tagged with the quarter-waveplate as dark and the remainder of the license plate as bright. Conversely, if the camera polarizer is oriented 90 degrees to the incident beam, the tagged area is seen as bright and the remainder of the license plate as dark.

In a third preferred embodiment, the first and second lasers operate at the same wavelength but pulsed at alternating times for providing orthogonally oriented polarizations using the first and second laser polarizers. The reflecting license plate surface or the target surface may be a retroreflecting surface with the two ¼ waveplates affixed thereto. The ¼ waveplate tags rotates both the first and second pulsed polarized laser beams to provide contrasting alternating images in the camera as shown in FIG. 2A. When the first laser in on and the second laser is off, the retroreflecting surface of the license plates is illuminated and a return image may be viewed and recorded with the camera polarizer blocking reflection from the tag having rotated the polarization of the first and second laser light beams. When the first laser is off and the second laser is on, the ¼ waveplate tags serve to rotate the polarization of the second laser beam for passage through the camera polarizer. As the first and second lasers are alternately pulsed, the camera views and records alternating images of illuminated tags and an illuminated license plate as an alternating contrasting image. As may be apparent, several embodiments are possible using a viewing means for receiving contrasting pulsating images of a tag disposed on a target and illuminated by pulsed light that is reflected toward and received by the camera.

The system provides for covert marking, tagging and tracking of license plates on moving vehicles using polarized light. The system offers many suitable alternatives for the light source, viewing means and imaging mechanism. The surveillance system can make use of low-cost, off-the-shelf components, namely clear adhesive tape, for example, Scotch™ tape, one or two light sources, one to three polarizers, and a video camcorder that has the capability for near infrared imaging, for example, a Sony™ camcorder with the NightShot™ feature. Transparent cellophane adhesive tape is known to have birefringent properties because of longitudinal stresses applied to the tape substrate during the manufacturing process. Two or three layers of Scotch™ tape behave as an approximation of a quarter-waveplate for visible and near infrared light. Two layers of Scotch tape of about 1.5"×3/4" in area and a similar three-layer Scotch tape patch can be quickly affixed to a retroreflective license plate. As a proof-of-concept in the visible region, a common D-cell flashlight, illuminating the license plate, held next to the eye of an observer enables the observer to see the retroreflected light beam. A 2"×2" square of Polaroid HN32 sheet polarizer is attached to the front of the flashlight with the plane of polarization oriented 45 degrees to the horizontal. Another square of HN32 polarizer is attached to the stem of a cordless screwdriver, such that the observer viewed the license plate through this second polarizer. When the cordless screwdriver was activated, the azimuth of the viewing polarizer rotated about one rev/sec. In this case, the observer sees very clearly the contrast reversal of target against background, that is, the tape on the license plate. Scotch tape is almost invisible on a retroreflective license plate. Therefore the major change for covert operation is to utilize a light source operating outside the visible region, namely the near infrared LED illuminator in the NightShot feature on a Sony camcorder, for example, Model CCDTRV65, or to substitute one or two higher-power near infrared laser diodes for the LED. The thickness of the tag is adjusted by layers of tape so that the tag functions as a quarter-wave thick plate for the near infrared illuminator.

Although a motor-driven rotating sheet polarizer is suitable, it may be desirable to implement a very quiet, more compact, and power efficient solution for a field-observation system. For example, two compact diode lasers oriented with their dominant planes of polarization 90 degrees apart may be used. The lasers are alternately switched on and off, giving a time-modulated polarizing illuminating beam. Use of the diode lasers eliminates the need for a rotating polarizer in front of the light source. The higher output power of a diode laser will allow longer-range observation than the lower power light emitting diode source in the standard NightShot illuminator. For example, two orthogonal diode lasers, alternately illuminating a near infrared quarter-waveplate against a retroreflecting plate, produced a noticeable target/background contrast reversal when seen with a hand-held near infrared viewer with a high transmittance near infrared polarizer placed in front of the camcorder lens. This system uses the polarization effects and a polarization-rotating tag to selectively block portions of an image. The use of oppositely polarized light sources produces negative and positive images for exploitation of the acute human ability to detect small rapid changes in a scene for enhanced visual tracking capabilities. The use of infrared illumination to render the image in combination with the transparent tag provides for covert monitoring. The system enables archival of evidence through camcorder video taping. Those skilled in the art can make enhancements, improvements, and modifications to the invention, and these enhancements, improvements, and modifications may nonetheless fall within the spirit and scope of the following claims.

What is claimed is:

1. system for surveiling a target, the system comprising,
   a ¼ wavelength tag affixed to the target,
   a laser for providing pulsed polarized laser light for illuminating the ¼ wavelength tag for rotating the polarization of the pulsed polarized laser light and for providing a tag image of the pulsed rotated polarized light within a background image, the tag image and the background image form a return image, the background image surrounding the tag image,
   a polarizer for receiving the return image, for communicating the tag image and for blocking the background image, and
   a camera for receiving the tag image.

2. The system of claim 1 wherein the laser, polarizer and camera are rigidly attached colocated together as a surveillance camera.

3. The system of claim 1 wherein the pulsed laser light is near infra red pulsed laser light having a wavelength between 700 nm and 950 nm.

4. The system of claim 1 further comprising,
   a filter for filter out sunlight having differing wavelengths than a wavelength of the pulse laser light.

5. The system of claim 1, wherein,
   the target is a motor vehicle,
   the tag is disposed over a license plate tag location.

6. The system of claim 1 wherein the laser comprises,
   a laser diode for providing laser light,
   a pulser for pulsing the laser light into pulsed laser light, and
   a polarizer for polarizing the pulsed laser light into the pulse polarized light.

7. The system of claim 1 wherein the laser comprises,
   a laser diode providing continuous polarized laser light, and
   a laser pulser for pulsing the laser diode to providing the pulsed polarized laser light.

8. The system of claim 1 wherein,
   the tag is a plurality of tags providing a respective plurality of return tag images, and
   the camera is for receiving the plurality of tag images.

9. The system of claim 1 wherein the tag comprises,
   a ¼ wave plate, and
   a retroreflector.

10. A system for surveillance imaging of a target, the system comprising,
    a first laser for providing a first pulsed polarized light,
    a second laser for providing a second pulse polarized light, the first and second pulsed polarized light are orthogonally polarized respecting each other, the first and second pulsed polarized lights are alternately pulsed respecting each other, a ¼ waveplate tag attached to the target for rotating the polarization of the first pulsed polarized light and for not rotating the second pulsed polarized light, and for providing a return tag image of the first rotated pulsed polarized light and the second unrotated pulsed polarized light, the target serving to reflect the first rotated pulsed polarize light and to reflect the second unrotated pulsed polarized light, a polarizer for receiving the return tag image, the polarizer for passing one and blocking the other one of the reflected first rotated pulsed polarized light and reflected second unrotated pulsed polarized light as a passed image and as a blocked image, respectively, and a camera for receiving the passed image, the passed image flickering as the first and second pulsed polarized light are alternately turned on and off.

11. The system of claim 10 further comprising a laser lens for focusing the pulsed laser light on the retroreflecting tag.

12. The system of claim 10 further comprising a camera lens for focusing the camera onto the return image.

13. The system of claim 10 further comprising a recorder for recording the return image over time.

14. The system of claim 10 wherein the tag comprises, a ¼ wave plate, and a retroreflector.

15. The system of claim 10 wherein the ¼ wave plate is made of transparent cellophane adhesive tape.

* * * * *